(12) United States Patent
Gaskins

(10) Patent No.: US 10,112,545 B1
(45) Date of Patent: Oct. 30, 2018

(54) VEHICLE-MOUNTED APPARATUS

(71) Applicant: Adam C. Gaskins, Starke, FL (US)

(72) Inventor: Adam C. Gaskins, Starke, FL (US)

( * ) Notice: Subject to any disclaimer, the term of this patent is extended or adjusted under 35 U.S.C. 154(b) by 48 days.

(21) Appl. No.: 15/617,477

(22) Filed: Jun. 8, 2017

Related U.S. Application Data

(60) Provisional application No. 62/347,239, filed on Jun. 8, 2016.

(51) Int. Cl.
*B60R 9/06* (2006.01)
*E05B 65/52* (2006.01)
*B60R 11/00* (2006.01)

(52) U.S. Cl.
CPC .............. *B60R 9/065* (2013.01); *E05B 65/52* (2013.01); *B60R 9/06* (2013.01); *B60R 2011/0052* (2013.01)

(58) Field of Classification Search
CPC ................. B60R 9/06; B60R 2011/004; B60R 2011/0052; B60R 2011/0075
USPC ........... 224/42.13, 488, 522, 526, 42.4, 503; 70/63, 258; 248/311.2; 220/737, 630, 220/480, 481
See application file for complete search history.

(56) References Cited

U.S. PATENT DOCUMENTS

| | | | | |
|---|---|---|---|---|
| 4,279,365 A | * | 7/1981 | Hutmacher | B63B 35/14 224/406 |
| 4,771,926 A | * | 9/1988 | Anderson | B60R 9/065 224/42.13 |
| 4,948,021 A | * | 8/1990 | Murphy | B60R 9/06 224/42.13 |
| 4,955,957 A | * | 9/1990 | Homes | A45C 11/20 220/324 |
| 5,133,489 A | * | 7/1992 | Loew | B60R 11/00 206/3 |
| 5,137,192 A | * | 8/1992 | Sheridan | B62D 43/02 211/17 |
| 5,165,645 A | * | 11/1992 | Brown | B60N 3/103 248/310 |
| 5,228,606 A | * | 7/1993 | Hickson | B60R 9/06 224/42.13 |
| 5,236,342 A | * | 8/1993 | Pellettier | B60R 11/06 224/512 |
| 5,462,211 A | * | 10/1995 | Eversoll | B60R 9/06 224/42.13 |
| 5,806,736 A | | 9/1998 | Kincart | |
| 5,855,309 A | * | 1/1999 | Hallsworth | B60R 9/00 224/401 |
| 6,179,184 B1 | | 1/2001 | Belinky et al. | |

(Continued)

OTHER PUBLICATIONS

Martin, Jason, Pinterest.com, Image of a cargo mounting scheme, https://www.pinterest.com/pin/522910206703973185/, no date, in Patentability Search Report dated Apr. 28, 2016.

(Continued)

*Primary Examiner* — Justin Larson
(74) *Attorney, Agent, or Firm* — Allen Dyer Doppelt & Gilchrist, PA

(57) ABSTRACT

A vehicle-mounting apparatus for carrying loads includes a receptacle having an interior volume defined by a front wall, a rear wall, two side walls, and a bottom surface. A mounting surface is integrally formed from the rear wall with a clearance distance from the rear wall. The mounting surface includes a plurality of mounting holes dimensioned to align to spare tire mounting holes on the rear side of a vehicle.

8 Claims, 9 Drawing Sheets

(56) References Cited

U.S. PATENT DOCUMENTS

| | | | | |
|---|---|---|---|---|
| 6,561,399 | B1* | 5/2003 | Loosbrock | B60R 9/00 224/402 |
| 6,588,720 | B1* | 7/2003 | Revette | B60N 3/102 211/70.6 |
| 6,604,390 | B1* | 8/2003 | Nooner | B65D 55/14 109/50 |
| 7,066,363 | B2* | 6/2006 | Lecoq | B60N 3/10 224/274 |
| 7,845,528 | B2* | 12/2010 | McMillan | B60R 9/10 224/310 |
| 8,371,548 | B1* | 2/2013 | Bishop | A45C 5/045 224/406 |
| 8,387,839 | B2* | 3/2013 | Sautter | B60R 9/06 224/42.13 |
| 9,352,698 | B2* | 5/2016 | Romanelli | B60R 9/06 |
| 9,919,642 | B2* | 3/2018 | Llewellyn | B60P 7/06 |
| 2004/0079779 | A1* | 4/2004 | Essig | B60R 9/00 224/550 |
| 2006/0261111 | A1* | 11/2006 | McCoy | B60R 9/065 224/499 |
| 2007/0095998 | A1* | 5/2007 | Gray | A47B 43/003 248/310 |
| 2011/0139844 | A1* | 6/2011 | Sautter | B60R 9/06 224/488 |
| 2012/0292357 | A1* | 11/2012 | Tennyson | B60R 9/06 224/281 |
| 2013/0233900 | A1* | 9/2013 | Cross | B60R 11/00 224/545 |
| 2015/0021371 | A1* | 1/2015 | Ward | B60R 9/06 224/499 |

OTHER PUBLICATIONS

McIntosh, Steven, Pinterest.com, Image of a cargo mounting scheme, https://www.pinterest.com/pin/450711875185662640/, no date, in Patentability Search Report dated Apr. 28, 2016.

* cited by examiner

VEHICLE-MOUNTED APPARATUS

CROSS-REFERENCE TO RELATED APPLICATION

The present application claims the benefit of U.S. Provisional Patent Application Ser. No. 62/347,239, filed on Jun. 8, 2016, the contents of which are herein incorporated by reference in their entirety.

FIELD OF THE INVENTION

The present invention relates to a vehicle mounted apparatus, and more particularly, a vehicle mounted apparatus for carrying a load.

BACKGROUND OF THE INVENTION

Various designs exist for a load carrier attachable to the exterior of a motor vehicle. Often, a load carrier is disposed at the rear of a motor vehicle, for example, adjoined to a trailer hitch affixed to a tractor. A load carrier can increase storage capacity and thus increase the space available inside a vehicle. While currently available load carriers are useful, further improvements are possible.

SUMMARY OF THE INVENTION

In view of the foregoing, it is an object of the present invention to provide an improved vehicle-mounted apparatus for carrying a load. According to one embodiment of the present invention, a vehicle-mounting apparatus for carrying a load includes a receptacle having an interior volume defined by a front wall, a rear wall, two side walls, and a bottom surface. A mounting surface is integrally formed by the rear wall at a clearance distance from the rear wall. The mounting surface includes a plurality of mounting holes dimensioned to align to mounting holes for a spare tire on the rear side of a vehicle.

According to another embodiment of the present invention, a method for mounting a vehicle-mounted apparatus on a vehicle includes removing the spare tire and the associated spare-tire mounting apparatus from the rear of the vehicle and aligning a plurality of mounting holes on the mounting surface of the vehicle-mounting apparatus to the spare-tire mounting holes on the vehicle. A plurality of connectors are secured through the aligned holes to the rear side of the vehicle such that the vehicle-mounting apparatus is secured to the vehicle.

These and other objects, aspects and advantages of the present invention will be better appreciated in view of the drawings and following detailed description of preferred embodiments.

DETAILED DESCRIPTION OF PREFERRED EMBODIMENTS

Figure 1:
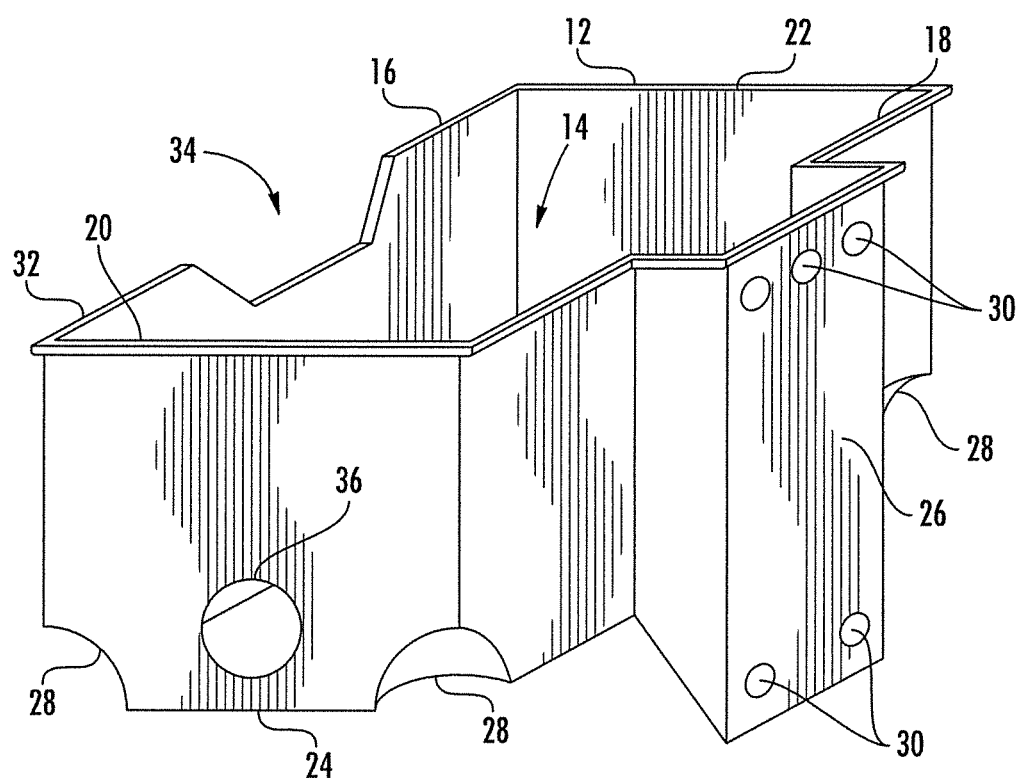
FIG. 1 is a perspective view of the vehicle-mounted apparatus, according to one embodiment of the present invention.
Figure 2:
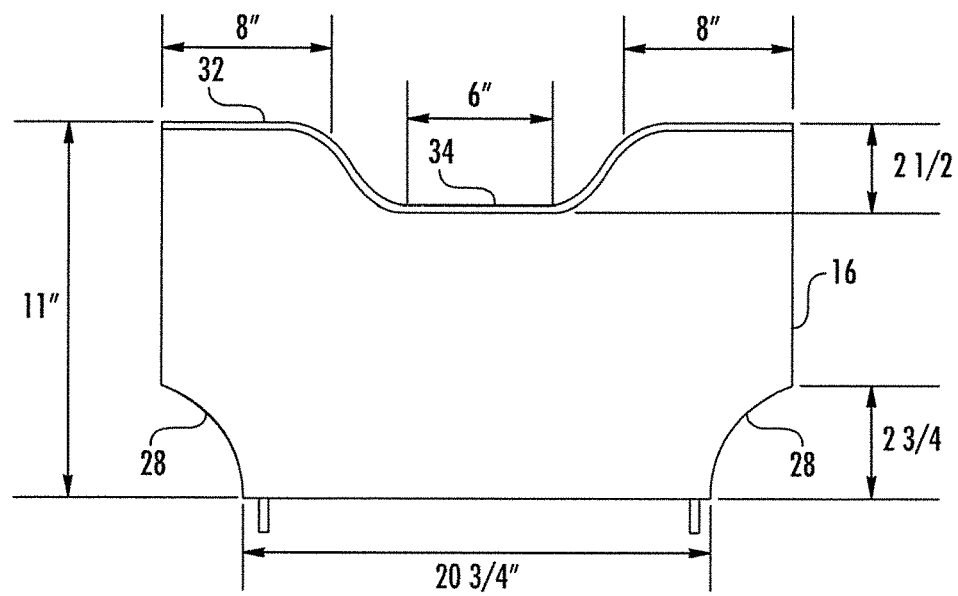
FIG. 2 is a front view of the apparatus of FIG. 1.
Figure 3:
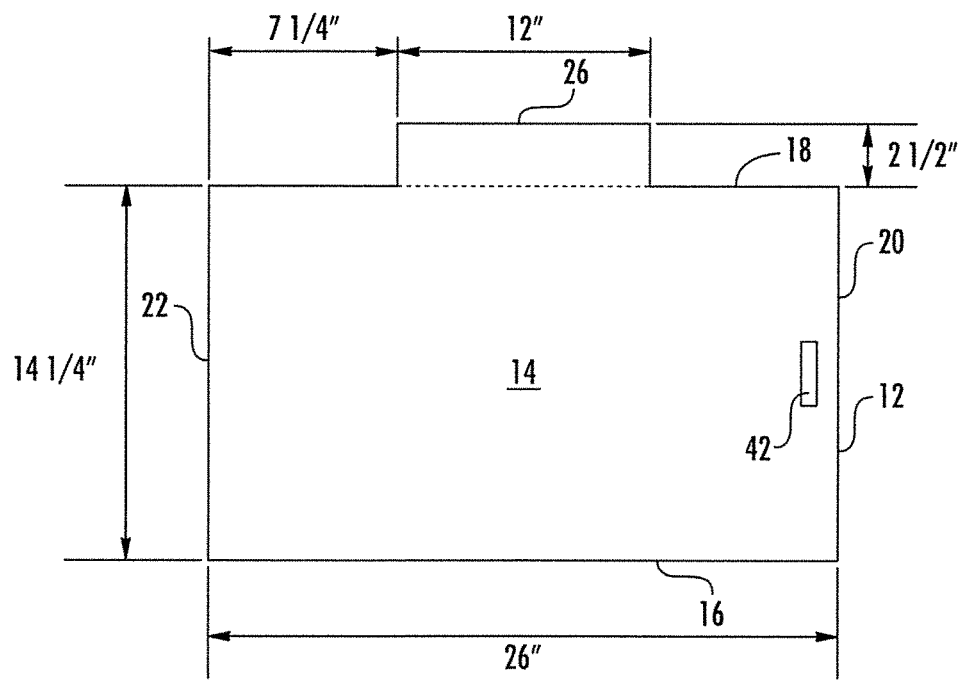
FIG. 3 is a top view of the apparatus of FIG. 1.

Referring to FIGS. 1-4, a vehicle-mounting apparatus 10 includes a receptacle 12 having an interior volume 14 defined by a front wall 16, a rear wall 18, two side walls 20 and 22, and a bottom surface 24. A mounting surface 26 is integrally formed from the rear wall 16 with a clearance distance (e.g., 2.5 inch) from the rear wall 16. The clearance distance can provide extra space to manipulate the bolts and other fasteners received through the mounting surface 26, when the load is positioned inside the receptacle 12.

In the depicted embodiment, the receptacle 12 is rectangular shape configured to fit a standard outdoor cooler. The front wall 14, the rear wall 16, and the mounting surface 26 are substantially parallel. The receptacle 12 can adopt other shapes for different purpose.

Referring to FIGS. 1-2 and 4-8, four openings 28 are formed at corners between the four vertical walls 16, 18, 20 and 22 and the bottom surface 24 to keep fluid (e.g., rain) from accumulating inside the receptacle 12. Additional drain holes or apertures can also be formed in the bottom surface 24.

The mounting surface 26 is substantially flat, providing greater surface contact with the outer rear surface of a vehicle to which apparatus 10 is mounted. The mounting surface 26 includes a set of mounting holes 30 dimensioned to align to the spare tire mounting holes on the rear side of the vehicle. In the depicted embodiment, the height of the mounting surface 26 is larger than the height of the receptacle 12. The number and location of mounting holes 30 and the dimension of the mounting surface 26 can be different for different vehicles.

Referring to FIGS. 1-2 and 5-8, the front wall 16 has a top edge 32 with a lowered middle portion 34, effectively allowing a user to easily open the cover of the storage container inside the receptacle 12.

Figure 4:
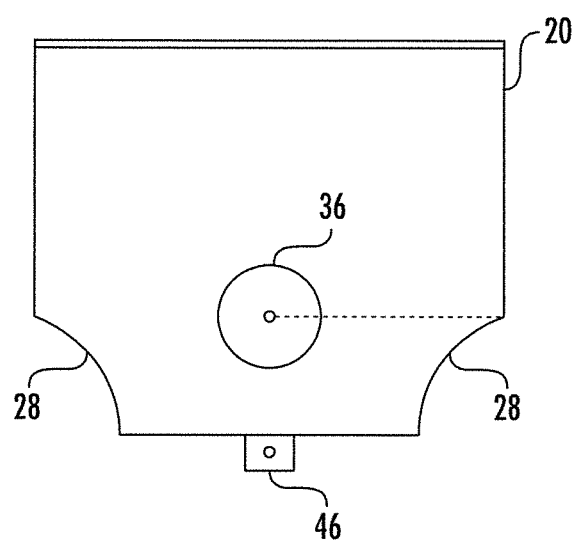
FIG. 4 is a side view of the apparatus of FIG. 1.
Figure 5:
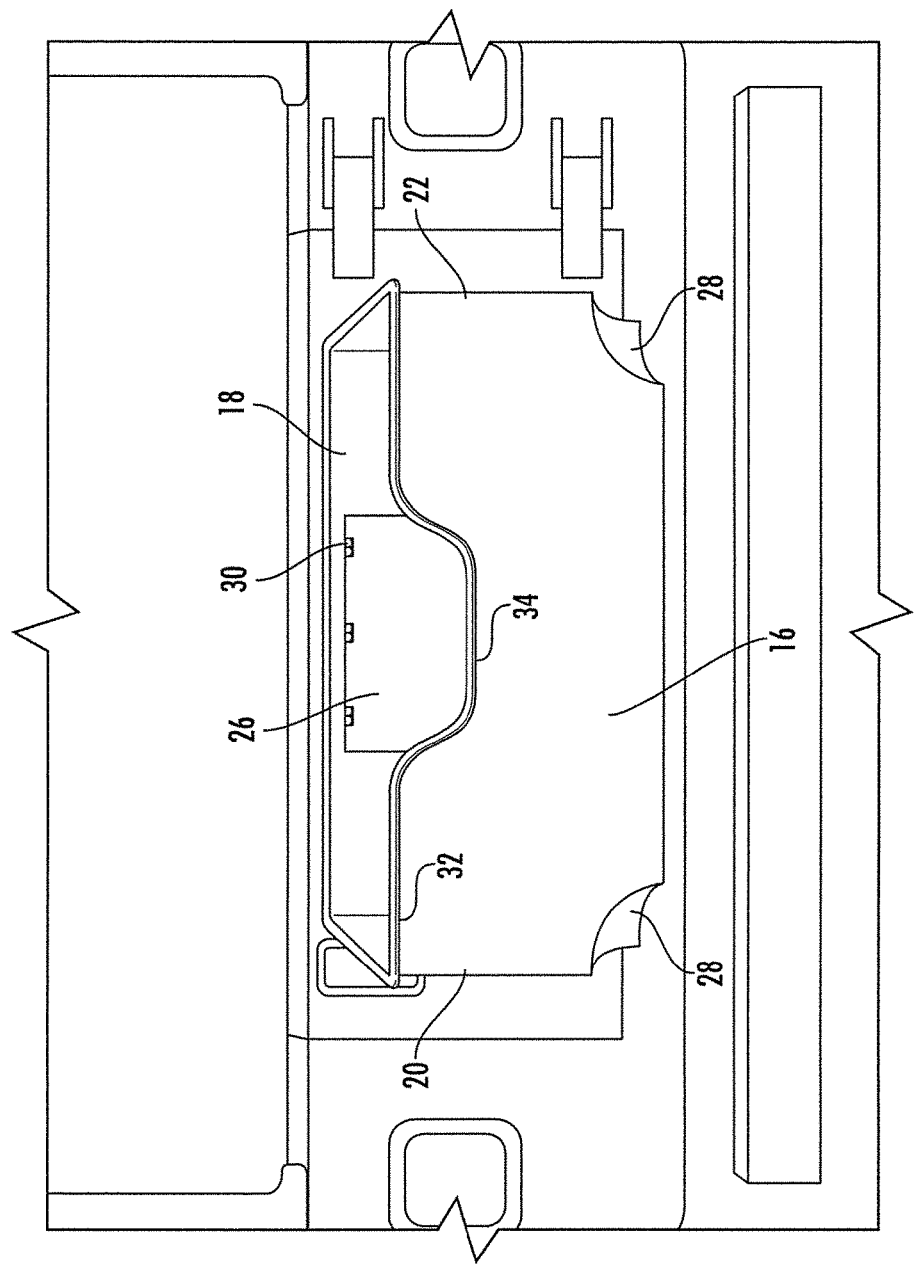
FIG. 5 is a perspective view of a vehicle-mounted apparatus of FIG. 1 mounted on the rear side of a vehicle.
Figure 6:
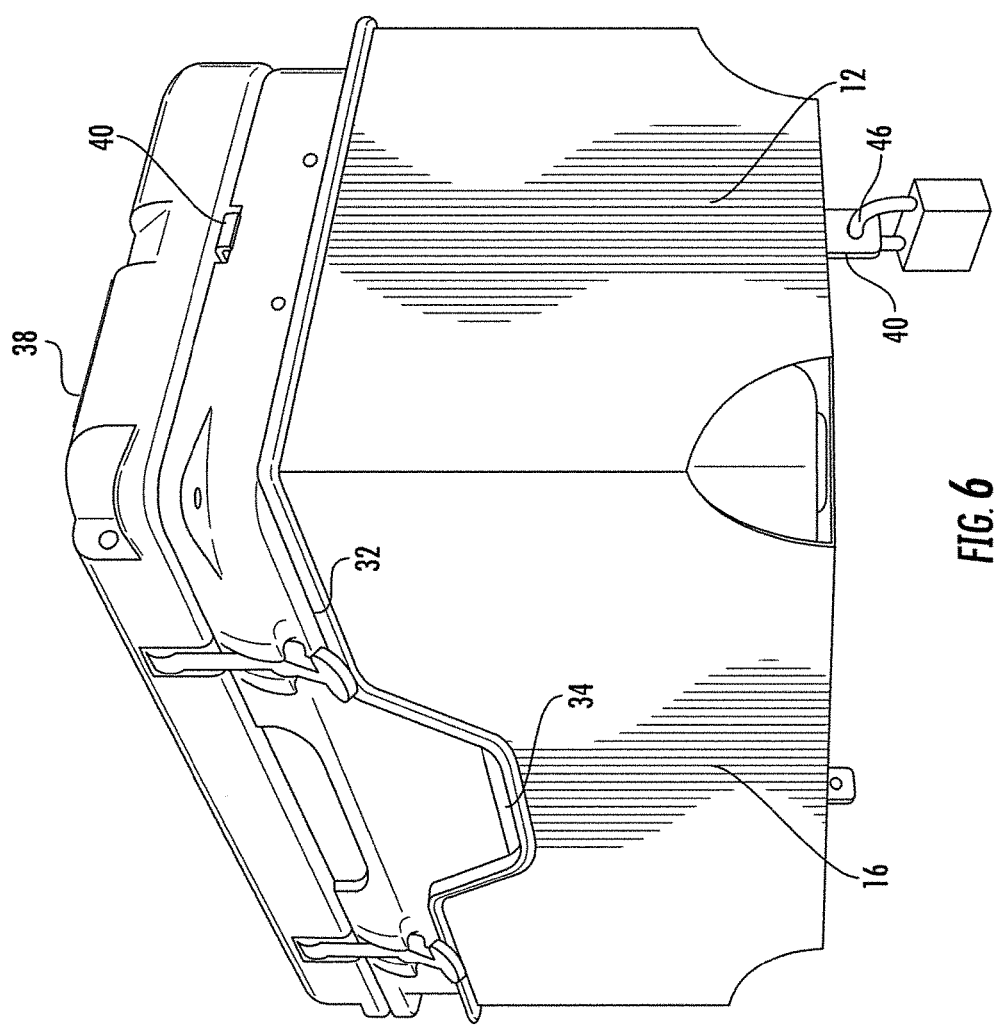
FIG. 6 is a perspective view of a vehicle-mounted apparatus of FIG. 1 with a container placed therein mounted on the rear side of a vehicle.
Figure 7:
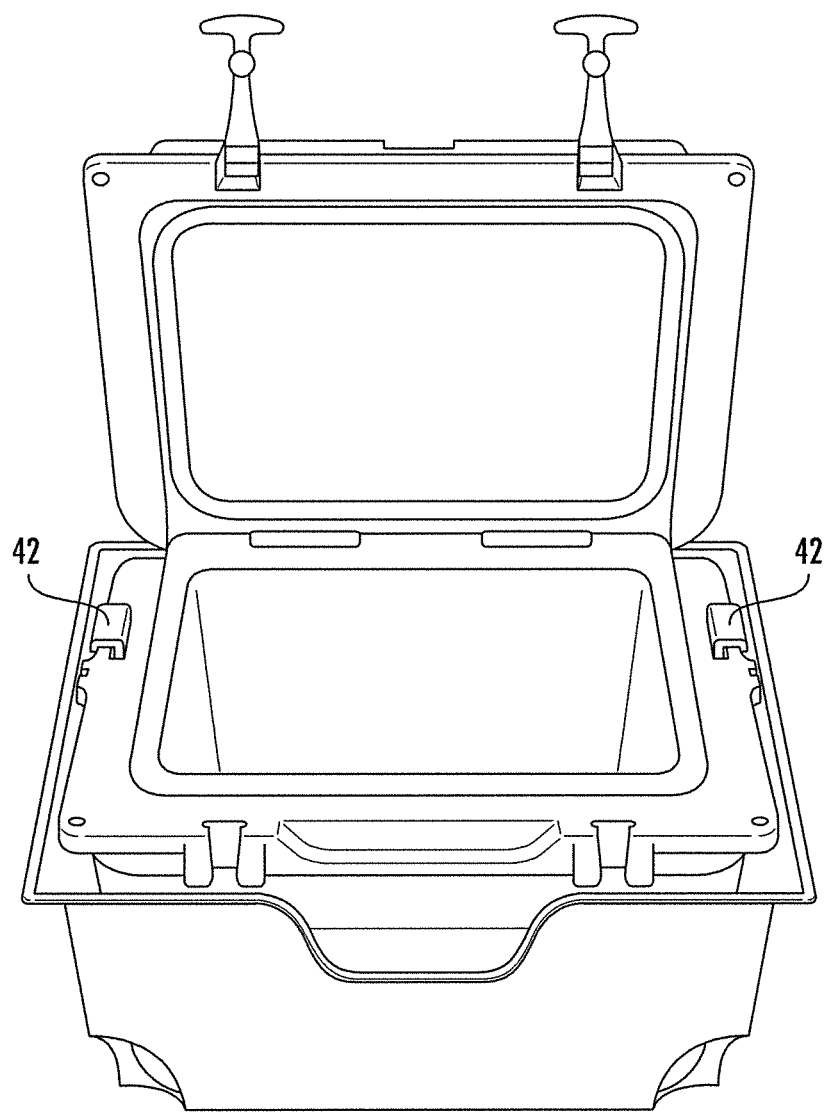
FIG. 7 is another perspective view of a vehicle-mounted apparatus of FIG. 1 with a container placed therein mounted on the rear side of a vehicle.

Referring to FIG. 4, when the apparatus 10 is designed to hold a cooler, a cooler drain hole 36 can be formed on at least one side wall 20 and 22 for a cooler's drain port to pass through. The drain hole 34 can be 3 inch in diameter for a standard cooler drain port. Other dimensions can be used as needed.

Referring to FIGS. 3-4 and 6-9, the apparatus 10 can further include a locking mechanism to securely lock certain types of container (e.g., a Yeti cooler) 38 inside the receptacle 12. For example, the locking mechanism includes a cable 40 configured to pass through a tie-down slot 42 on the container 38 and a slot 44 at the bottom surface 24 and secured at the bottom surface 24 to secure the container 38 inside the receptacle 12. A locking bracket 46 is mounted underneath the bottom surface 24 of the receptacle 12 in close proximity to the slot 42. A square padlock 48 or another appropriate lock can then be passed through the cable 40 and the locking bracket 46 to secure the container 38 inside the receptacle 12. The locking mechanism can thus provide extra security for container 38.

Figure 8:
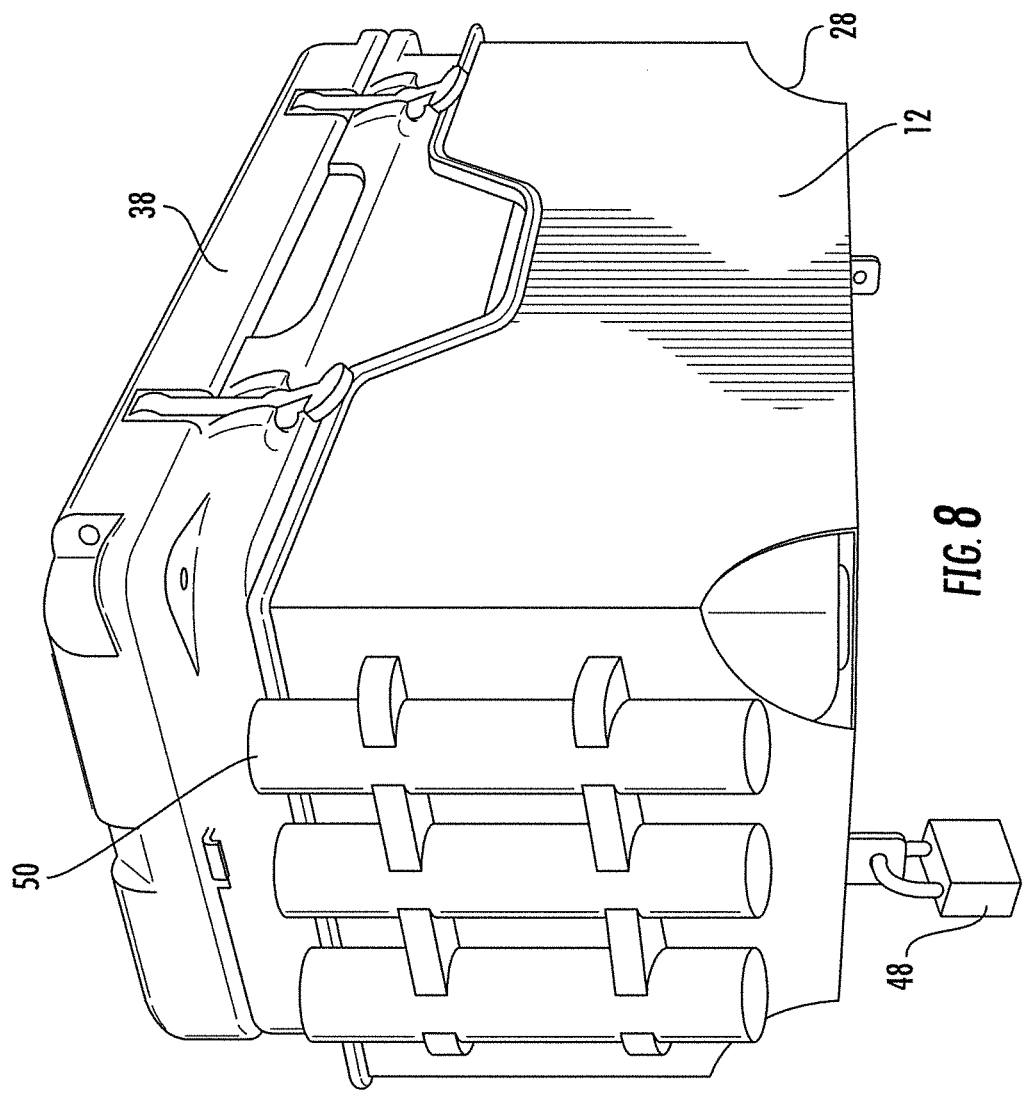
FIG. 8 is a perspective view of a vehicle-mounted apparatus mounted on the rear side of a vehicle, according to another embodiment of the present invention.
Figure 9:
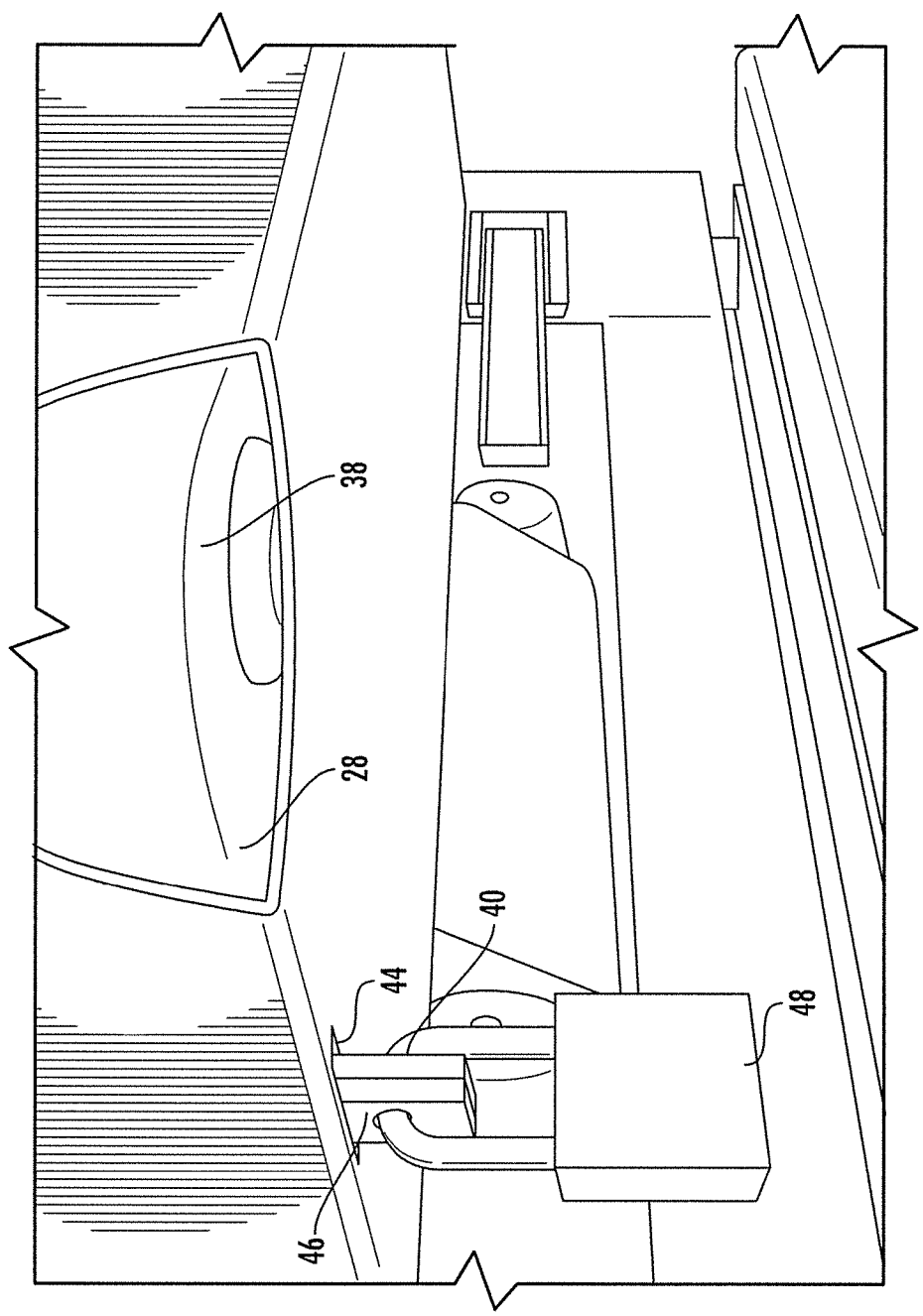
FIG. 9 is a detailed view of a locking mechanism of a vehicle-mounted apparatus, according to one embodiment of the present invention.

Referring to FIG. 8, in one embodiment, one or more fishing pole holders 50 are formed adjacent to a sidewall of the receptacle 12. Other types of additional holders for additional storage can also be attached and/or integrally formed at a sidewall and/or front wall of the receptacle 12.

The apparatus 10 is preferably made of aluminum, another metal material or plastic. However, other materials having suitable properties, including strength, weight, rigidity, and the like, can also be used. The apparatus 10 can advantageously be made of a single sheet of stamped aluminum alloy or another metal. The apparatus 10 can also be painted to match the color of a vehicle and/or include different designs, patterns, and/or messages.

Dimensions of apparatus 10 are given herein as 26" by 14.25" for length and width, and 11" for height for holding a certain type of cooler. It will be appreciated, however, that the dimensions could be adapted for storage carrier of different dimensions (e.g., different sized coolers) and/or shapes (e.g., square, circular).

Figure 10:
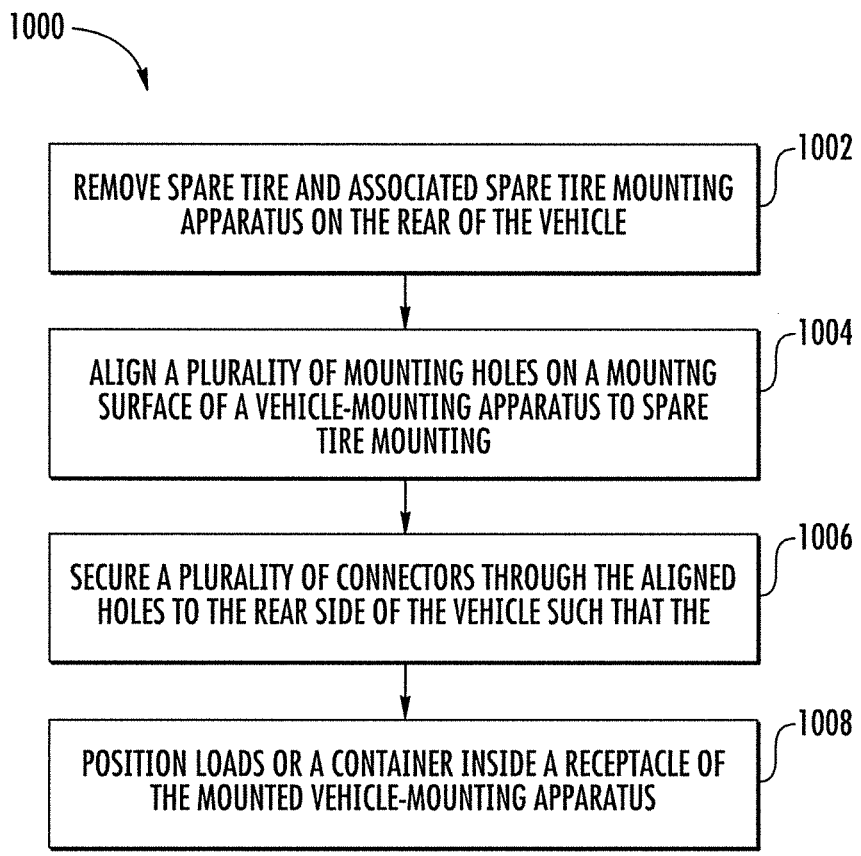
FIG. 10 is a flowchart illustrating mounting a vehicle-mounted apparatus to a rear side of a vehicle.

Referring to FIG. 10, a method to mount the apparatus 10 to the rear side of a vehicle includes removing the spare tire and the associated spare-tire mounting apparatus from the vehicle at step 1002. At step 1004, the mounting holes 30 on the mounting surface 26 are aligned to the mounting holes of the spare tire mount. At step 1006, connectors such as bolts are received through the aligned holes and secured to the rear side of the vehicle. At step 1008, loads or a container 38 (e.g., a cooler) can be positioned inside the receptacle 12 of the apparatus 10. The container 38 can be secured to the receptacle 12 via a locking mechanism. One or more brake lights can be removed from the vehicle and mounted on the front wall 16 of the receptacle 12.

The vehicle mounted apparatus 10 can be attached to the spare tire mounting space of a SUV, a truck, a jeep, a wagon, or another suitable motor vehicle. The receptacle 12 can be used to hold a wide variety of items, for example, a cooler, luggage, clothing, food, beverages, recreational and sports equipment, camping equipment, furniture, spare tires, cutting board, other equipment, and the like.

The foregoing is provided for illustrative and exemplary purposes; the present invention is not necessarily limited thereto. Rather, those skilled in the art will appreciate that various modifications, as well as adaptations to particular circumstances, are possible within the scope of the invention as herein shown and described.

What is claimed is:

1. A method for mounting a vehicle-mounting apparatus on a vehicle comprising:
    removing a spare tire and associated spare tire mounting apparatus on the rear of the vehicle;
    aligning a plurality of mounting holes on a mounting surface of a vehicle-mounting apparatus to spare tire mounting holes on the vehicle;
    securing a plurality of connectors through the aligned holes to the rear side of the vehicle such that the vehicle-mounting apparatus is secured to the vehicle.

2. The method of claim 1, further comprising:
    positioning a container inside a receptacle of the mounted vehicle-mounting apparatus.

3. The method of claim 1, further comprising securing the container inside a receptacle.

4. The method of claim 3, wherein securing the container inside the receptacle further comprising:
    passing a cable through a slot on the container and a slot at the bottom surface of the receptacle; and
    securing the cable to the bottom surface of the receptacle.

5. The method of claim 4, wherein securing the cable to the bottom surface of the receptacle comprising:
    passing a lock through the cable and a locking bracket mounted underneath the bottom surface of the receptacle in close proximity to the slot at the bottom of the receptacle.

6. The method of claim 1, further comprising:
    removing one or more brake lights at the rear side of the vehicle; and
    mounting the one or more brake lights to a front wall of a receptacle of the vehicle-mounting apparatus.

7. The method of claim 1, further comprising:
    positioning one or more objects into additional holders on the vehicle-mounted apparatus.

8. The method of claim 1, wherein the one or more objects are one or more fishing poles.

* * * * *